US012083055B2

(12) United States Patent
Rawlings et al.

(10) Patent No.: US 12,083,055 B2
(45) Date of Patent: Sep. 10, 2024

(54) TACTILE AND NESTED CREMATION CONTAINER

(71) Applicant: BLVE LLC, New York, NY (US)

(72) Inventors: Brittany Rawlings, Naples, FL (US); Brandon Engholm, New York, NY (US)

(73) Assignee: BLVE LLC, New York, NY (US)

( * ) Notice: Subject to any disclaimer, the term of this patent is extended or adjusted under 35 U.S.C. 154(b) by 142 days.

(21) Appl. No.: 17/850,108

(22) Filed: Jun. 27, 2022

(65) Prior Publication Data

US 2022/0409464 A1 Dec. 29, 2022

Related U.S. Application Data

(60) Provisional application No. 63/215,479, filed on Jun. 27, 2021.

(51) Int. Cl.
*A61G 17/08* (2006.01)
*A61G 17/007* (2006.01)

(52) U.S. Cl.
CPC .......... *A61G 17/08* (2013.01); *A61G 17/007* (2013.01)

(58) Field of Classification Search
CPC .. A61G 17/08; A61G 17/007; A61G 17/0136; E04H 13/006; E04H 13/008; B65D 21/0233
See application file for complete search history.

(56) References Cited

U.S. PATENT DOCUMENTS

| | | | |
|---|---|---|---|
| 853,639 | A | 5/1907 | Hincks |
| 1,346,176 | A | 7/1920 | Chambers |
| 1,558,278 | A | 10/1925 | Phillips |
| 1,660,085 | A | 2/1928 | Elnain |
| 1,758,024 | A | 5/1930 | Blomquist |
| 2,009,724 | A | 7/1935 | Bircher |
| 2,075,859 | A | 4/1937 | Martin |
| 2,129,654 | A | 9/1938 | Dennis |
| 2,235,617 | A | 3/1941 | Klinzing |
| 2,385,520 | A | 9/1945 | Klinzing |
| 2,562,726 | A | 7/1951 | MacDonald et al. |
| 2,618,892 | A | 11/1952 | Locks et al. |

(Continued)

FOREIGN PATENT DOCUMENTS

| | | | |
|---|---|---|---|
| CA | 2639274 | A1 | 3/2010 |
| DE | 19919086 | A1 | 11/2000 |

(Continued)

OTHER PUBLICATIONS

International Search Report and Written Opinion in International Patent Application No. PCT/US22/35098, 19 pages.

*Primary Examiner* — William L Miller

(74) *Attorney, Agent, or Firm* — Hahn Loeser & Parks LLP

(57) ABSTRACT

The present disclosure is for a tactile and nested cremation container providing multiple uses and arrangements to comfort a grieving party through various stages of mourning after losing a beloved. The tactile cremation container of the present disclosure has a manipulable bladder that a user may hold, cuddle, manipulate, travel with, etc. the cremated remains of a deceased beloved through. The tactile cremation container may be further surrounded by an outer shell in a decorative manner. The tactile cremation container may also be removably nested in an exterior case.

29 Claims, 10 Drawing Sheets

(56) References Cited

U.S. PATENT DOCUMENTS

| | | | |
|---|---|---|---|
| 3,105,612 A | 10/1963 | Krasnoff et al. | |
| 3,167,844 A | 2/1965 | Bachofner | |
| 3,488,818 A | 1/1970 | Orr | |
| 3,966,075 A | 6/1976 | Schultz | |
| 4,199,848 A | 4/1980 | Kohnert | |
| 4,324,026 A | 4/1982 | Craft | |
| 4,568,298 A | 2/1986 | Acree | |
| 4,714,445 A | 12/1987 | Templeton | |
| 4,816,000 A | 3/1989 | Hsu | |
| 5,208,957 A | 5/1993 | Hereford | |
| 5,287,603 A | 2/1994 | Schorman | |
| 5,326,300 A | 7/1994 | Sonders | |
| 5,341,548 A | 8/1994 | Zerick | |
| 5,349,727 A | 9/1994 | Niebergall | |
| 5,379,499 A | 1/1995 | Jackson | |
| 5,386,909 A | 2/1995 | Spector | |
| 5,676,583 A | 10/1997 | Wang et al. | |
| 5,702,003 A | 12/1997 | Springer | |
| 6,023,822 A | 2/2000 | Luebke | |
| 6,052,877 A | 4/2000 | Richard | |
| 6,076,292 A | 6/2000 | Kawa | |
| 6,510,596 B1 | 1/2003 | McCarthy | |
| 6,785,938 B1 | 9/2004 | Johansen, Jr. | |
| 7,096,546 B2 | 8/2006 | Poirier | |
| 7,178,209 B1 | 2/2007 | Radziewicz | |
| 7,308,741 B1 | 12/2007 | Rydberg et al. | |
| 7,631,404 B2 | 12/2009 | Scruggs | |
| 7,739,776 B2 | 6/2010 | Hume | |
| D629,584 S | 12/2010 | Riehl | |
| 8,052,933 B2 | 11/2011 | Schirmer et al. | |
| 8,286,314 B1 | 10/2012 | Muthusami | |
| D700,765 S * | 3/2014 | Goldstein | D99/5 |
| 8,707,526 B2 | 4/2014 | Cooke et al. | |
| 8,800,122 B2 | 8/2014 | Pato | |
| 8,844,102 B2 | 9/2014 | Giannetti | |
| 9,074,387 B2 | 7/2015 | Camp, Jr. | |
| 9,107,791 B2 | 8/2015 | Gee | |
| 9,198,819 B2 * | 12/2015 | Reynolds | A61G 17/08 |
| D759,338 S * | 6/2016 | Reynolds | A61G 17/08 D99/5 |
| 9,358,171 B1 | 6/2016 | Crawford | |
| 9,775,760 B1 | 10/2017 | Roy | |
| 9,925,470 B1 | 3/2018 | Palacio | |
| 10,245,203 B1 | 4/2019 | Norris | |
| 10,688,006 B2 | 6/2020 | Seltzer | |
| 10,780,007 B1 | 9/2020 | Seitz | |
| 10,786,410 B2 | 9/2020 | Venosi | |
| D946,859 S * | 3/2022 | Marsh | D99/12 |
| 11,484,457 B1 * | 11/2022 | Corum | B65D 33/2508 |
| 2002/0100152 A1 | 8/2002 | Ortega | |
| 2006/0059669 A1 | 3/2006 | Rose | |
| 2009/0020488 A1 * | 1/2009 | Turkel | A61G 17/0136 211/85.27 |
| 2009/0025194 A1 * | 1/2009 | Pearce | A61G 17/08 27/1 |
| 2010/0101062 A1 | 4/2010 | Chen et al. | |
| 2010/0101063 A1 | 4/2010 | Chen et al. | |
| 2011/0005048 A1 * | 1/2011 | Davis | A61G 17/08 27/1 |
| 2013/0152348 A1 | 6/2013 | Taylor | |
| 2015/0202108 A1 * | 7/2015 | Kilian | A61G 99/00 27/1 |
| 2019/0070056 A1 * | 3/2019 | Seltzer | A63H 3/02 |

FOREIGN PATENT DOCUMENTS

| | | | |
|---|---|---|---|
| DE | 102005045860 | B3 | 10/2006 |
| JP | 6471293 | B2 | 2/2019 |
| KR | 20140104117 | A | 8/2014 |
| WO | 2010146219 | A1 | 12/2010 |

* cited by examiner

TACTILE AND NESTED CREMATION CONTAINER

CROSS-REFERENCE TO RELATED APPLICATIONS

This patent application claims priority to, and the benefit of, U.S. Provisional Patent Application No. 63/215,479, filed Jun. 27, 2021 with the United States Patent Office, which is herein incorporated by reference in its entirety.

BACKGROUND

This disclosure relates generally to urns and, more specifically, to cinerary urns, containers, or arrangements of containers for collecting, holding, or inurnment of cremated remains of a deceased beloved. A deceased beloved may include a deceased human, animal, or pet, alike.

Urns are vessels that may be used in burial of cremated remains, a transport vessel of the cremated remains, or a display vessel for holding the cremated remains of the lost beloved. Urns may be left on display, with the cremated remains therein, in remembrance of the lost beloved. The remains within an urn remain inaccessible while in the urn. The remains are only accessed in the event of transfer to another container, or vessel, or when the remains may be scattered.

The grieving process after losing a beloved has many stages. This process may be manifested in both physical and emotional feelings. Just as a griever may long for the emotional interaction with a deceased beloved, the living may also long for the physical touch of the deceased beloved. Current urns do little to accommodate these stages or needs. Urns are typically stale, fragile, cold, hard, and isolated containers. To some, this is not how they wish to remember or memorialize their deceased beloved. Traditional urns are not meant to be held, handled or traveled. To some, this manner of displaying the remains of a deceased beloved does not exude comfort and may actually bring guilt, by simply discarding the deceased beloved on a shelf and/or on display with less important keepsakes. While a traditional urn may be appropriate once a griever has accepted the lost (e.g., the seventh stage of mourning), a traditional urn leaves an enormous and critical void during the earlier, most difficult stages of mourning.

Accordingly, a grieving party could benefit from the comfort of cuddling, holding, sleeping with, traveling with, simply being in the presence of, or having a feeling of being in physical contact with the remains of the beloved. A griever could also benefit from an urn arrangement that has the flexibility of being adaptable to accommodate different uses, or handling, of the cremated remains during the many stages of the mourning process, and that will transition with the person for years beyond. While some have attempted to achieve this objective in the form of securing cremated remains or memorabilia within a container that is further placed within a plush pillow or a stuffed toy, there remains separation between the griever and the cremated remains of the deceased beloved with this approach. Moreover, some may find such arrangements to be juvenile (e.g., plush toy), impractical, or gimmicky. In such arrangements, the griever is not achieving a physical connection with the remains of the deceased beloved but, instead, is only physically engaging the plush filling of the pillow, the stuffing of the stuffed toy, a filler, or barrier, not of the cremated remains themselves, or a filler, or barrier, in which the cremated remains are concealed or hidden. There remains a disconnect between the griever and the deceased beloved.

Therefore, what is needed is an urn, or cremation container, that provides physical interaction with the cremated remains of a deceased belove. What is further needed is an arrangement that further interchangeably facilitates different uses, handling, traveling, or storing of the cremated remains during the various stages of mourning, and years beyond. Both of these are needed without requiring the direct handling of, or the risk of coming into direct contact with, the cremated remains. Further, such flexibility is needed to reduce the need, difficulty, and expense of having to engage a crematorium or funeral professional to accommodate transitioning cremated remains through varying arrangements and the griever's own lifetime.

SUMMARY

The tactile product and nested arrangement of said product of the present disclosure resolves the above listed obstacles. Specifically, the present disclosure sets forth features of a tactile and nested cremation container and methods for arranging the same.

The tactile cremation container of the present disclosure comprises a soft manipulable bladder. A user directly engages the soft manipulable bladder for a tactile relationship directly with the cremated remains stored therein. The soft manipulable bladder comprises an internal void with the cremated remains therein. An opening extends through the soft manipulable bladder into the void. A recessed or flush seal seals the opening through the soft manipulable bladder. The internal void is fully enclosed once sealed and the cremated remains are in direct contact with the interior of soft manipulable bladder that a user directly engages the exterior of. When sealed, the void is airtight. The cremated remains are felt and manipulated within the soft manipulable bladder through the soft manipulable bladder. The seal may be a releasable lockable seal so to secure the cremated remains without inadvertently having the cremated remains escape from the soft manipulable bladder. In some examples, the tactile cremation container may further comprise a filter media. The filter media may be placed across the opening for removing air from within the void while maintaining the cremated remains within the void prior to sealing the void. Additionally, or alternatively, a sealable vent may extend through the seal or the soft manipulable bladder for adding or releasing air from within the void of the soft manipulable bladder while maintaining the cremated remains within the bladder. Likewise, a filter media may be placed within or across the vent. In some examples, the seal may be a threaded cap received by a threaded fitting. The threaded fitting may extend from the soft manipulable bladder in the recessed arrangement. In some examples the seal, or components thereof, may be made of the same material as the soft manipulable bladder. The material of the seal may be of a different density than the material of the soft manipulable bladder. More specifically, the material of the seal may be denser, or more rigid, than the material of the soft manipulable bladder. In other examples, the seal or one or more of the component thereof, may be made of a different material than that of the soft manipulable bladder.

In some examples, the tactile cremation container may be an ellipsoid. In some examples, the soft manipulable bladder may be of a single layer of material. In other examples, the soft manipulable bladder may be of a laminated material having multiple layers. The multiple layers of the laminated material may be of the same material or of different material.

The tactile cremation container may further comprise an outer shell. The outer shell may be a removable outer shell. The outer shell may wrap the soft manipulable bladder. While it may also be, the outer shell need not be airtight as it may only be decorative. The outer shell may further conceal the seal of the soft manipulable bladder. In some examples, the outer shell may be secured to the seal of the soft manipulable bladder by an escutcheon. In examples, the soft manipulable bladder remains manipulable through the outer shell.

The tactile cremation container may also be in a nested arrangement. A tactile and nested cremation container may comprise the tactile cremation container as described herein and an exterior case comprising a base and a removable lid. The soft manipulable bladder removably rests, or is nested on, the base in a nested arrangement and is fully concealed by the removable lid when the lid is positioned on the base.

Methods for arranging or utilizing a tactile cremation container are also provided herein.

The method comprises the steps of:

- filling an internal void of a manipulable bladder of a tactile cremation container with cremated remains through an opening in the manipulable bladder wherein the cremated remains are in direct contact with the manipulable bladder;
- bleeding air from the internal void of the manipulable bladder, such as through a filter media, without releasing the cremated remains for the internal void of the manipulable bladder;
- sealing the internal void of the manipulable bladder by applying a seal to the opening in the manipulable bladder such that the internal void is airtight;
- tactilely manipulating the cremated remains directly through the manipulable bladder.

The method may further comprise a step of:

- wrapping the tactile cremation container with an outer shell wherein the manipulable bladder of the tactile cremation container remains manipulable through the outer shell; and/or
- nesting the tactile cremation container within an exterior case by placing the tactile cremation container on the base of the exterior case and adding a removable lid to the base of the exterior case to fully enclose the tactile cremation container.

In some examples, the step of filling the void is done such that between 50% and 100% of the void of the manipulable bladder is filled with the cremated remains.

The foregoing and other objects, features, and advantages of the examples will be apparent from the following more detailed descriptions of particular examples as illustrated in the accompanying drawings wherein like reference numbers represent like parts of the examples.

BRIEF DESCRIPTION OF THE DRAWINGS

Reference is made to the accompanying drawings in which particular examples and further benefits of the examples are illustrated as described in more detail in the description below, in which.

DETAILED DESCRIPTION

Figure 1:
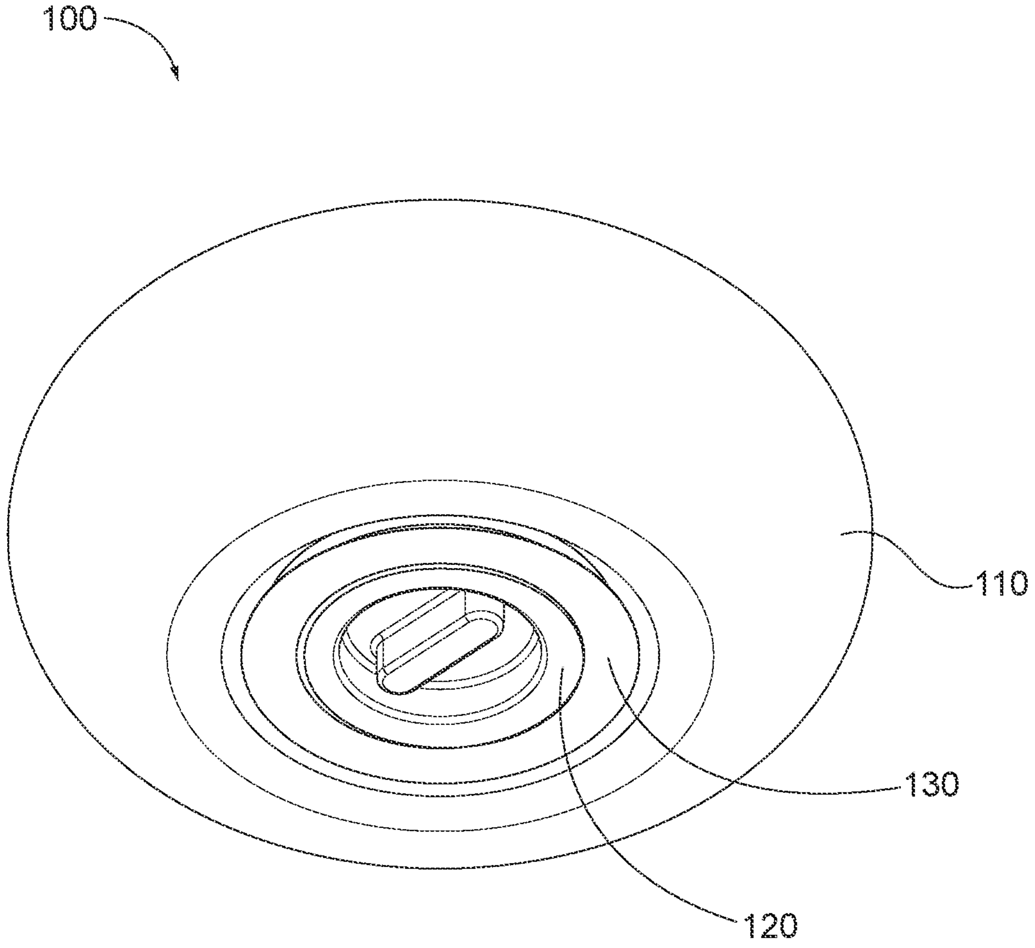
FIG. 1 is a bottom perspective view of a tactile cremation container, in accordance with an example of this disclosure.

This disclosure relates generally to urns and, more specifically, to cinerary urns, containers, or arrangements of containers for collecting, holding, or inurnment of the cremated remains of a deceased beloved. A deceased beloved may include a deceased human, animal, or pet, alike.

The tactile cremation container of the present disclosure is a container relied on for storing cremated remains or cremated possessions. Traditional urns are solid structures that are fairly stale, or not comforting in the least. This is typically not how one would like to remember their loved ones, being set aside on display only. The tactile cremation container of the present disclosure is a bladder that is soft, malleable, and/or manipulable, thereby, providing the grieving party the ability to cuddle with or embrace the remains contained within the container. By example, a user may wish to pick-up, cuddle, sleep with, travel with, undertake activities with, or hold, the cremated remains within the tactile cremation container. The bladder of the tactile cremation container is in direct contact with the cremated remains of the lost beloved as their remains are maintained within a void of the bladder. The tactile cremation container of the present disclosure translates the cremated remains in a tactile manner through the bladder. The remains contained within the container may be directly moved and manipulated within the bladder by moving and manipulating the bladder material. The tactile cremation container of the present disclosure is not intended to sugar-coat the reality of death by hiding the cremated remains somewhere within a hard container or within a container deep within stuffing or a filling. The nested tactile cremation container of the present disclosure is about embracing the transfiguration of a lost beloved in a new form and easing the stages of mourning though a modifiable, multi-use, nested arrangement.

While it is appreciated that other plush objects or stuffed toys may possess an internal container possessing remains, the plush object or stuffed toy is not the container contacting or possessing the remains. Further, it is not the remains within these other plush objects or stuffed toys which provide the tactile and/or soft nature of the container that are further manipulable. Instead, the filling or the stuffing of the plush object or toy is what is manipulated in a tactile manner. This only creates an artificial tactile relationship with the cremated remains that only further separates the container possessing the remains therein and the grieving party. Specifically, it is the filling or stuffing of these other plush objects that are moved and manipulated, and not the remains within the container of these other plush objects that are moved or manipulated by a user.

In the tactile cremation container of the present disclosure the bladder remains soft, malleable, and/or manipulable. The bladder of the tactile cremation container is in direct contact with the cremated remains and provides a layer of separation between a grieving party and the contents within the bladder. The layer of separation may be a single layer but may also be laminated layers while also maintaining the tactile nature of the tactile cremation container. In other words, the bladder is squeezable such that a user may directly engage the contents, or cremated remains, maintained therein. There is no intermediate layer, intermediate material, or separate container of a different construction preventing tactile engagement with the cremated remains, and if there is an added layer such as, for example, an outer shell as further described below, it does not impede upon the tactile nature of the bladder relative to the contents therein. There is no separate container possessing the cremated remains further within the tactile cremation container. There is no intermediate filling that is meant to be manipulated instead of the cremated remains maintained therein.

When the bladder is filled with cremated remains, the cremated remains are felt, in a tactile manner, through the bladder such that they may be moved from one side of a bladder to another side of the bladder or within the bladder by manipulating the bladder. Additionally, or alternatively, the weight of the cremated remains are felt directly by the grieving party. In other words, the weight of the cremated remains translate through the bladder giving the bladder a weighted feel, or deep pressure stimulation, felt directly by the grieving party. This is in contrast to a grieving party engaging and/or feeling the weight under the urn or feeling the stuffing or fillers about an urn, regardless of the contents. Yet, features of the bladder maintain the cremated remains in a safe and enclosed void such that they are not directly exposed to the grieving party, except when the bladder is purposefully unsealed, or opened. The bladder may be made of a soft material such as, for example, rubber, silicon, polymer, laminate(s) of various kinds, nylon(s), a combination thereof, or the like. While soft, the bladder material is stabilized, durable, and non-breakable. Specifically, the bladder material may be selected for particular properties such as, for example, being durable, fireproof, fire resistant, waterproof, water resistant, conductive (e.g., transferring/holding hot and/or cold properties), puncture resistant, puncture proof, of a particular thickness, flexible, malleable, manipulable, impervious, non-porous, of various textures, hypoallergenic, non-toxic, BPA free, BPS free, environmentally friendly, made from recyclable material, a combination thereof, or the like. In particular examples, the bladder material and the sealing arrangement thereof are of a material and components that have been stress-tested to undergo pressure from a human body so not to pop or puncture if rolled onto by a grieving party. Additionally, or alternatively, as noted above, the bladder material may be conductive such that it may be warmed, for example, by the griever's own body heat, and retain heat, so that a user may further enjoy warmth while embracing the tactile cremation container with the cremated remains of the beloved therein. This provides an additional degree of comfort to the grieving party relative to the cremated remains. In other words, body warmth from the grieving party may radiate through the bladder to heat the cremated remains wherein the heated cremated remains are, in return, felt by the grieving party. If instead, a user may rather enjoy a cooling touch the bladder material may be cooled, retaining the cold. It is further appreciated herein that the bladder material may be a combination, or layering, of various materials to impart a variety of properties while still maintaining the flexible and tactile nature of the tactile cremation container.

Figure 2:
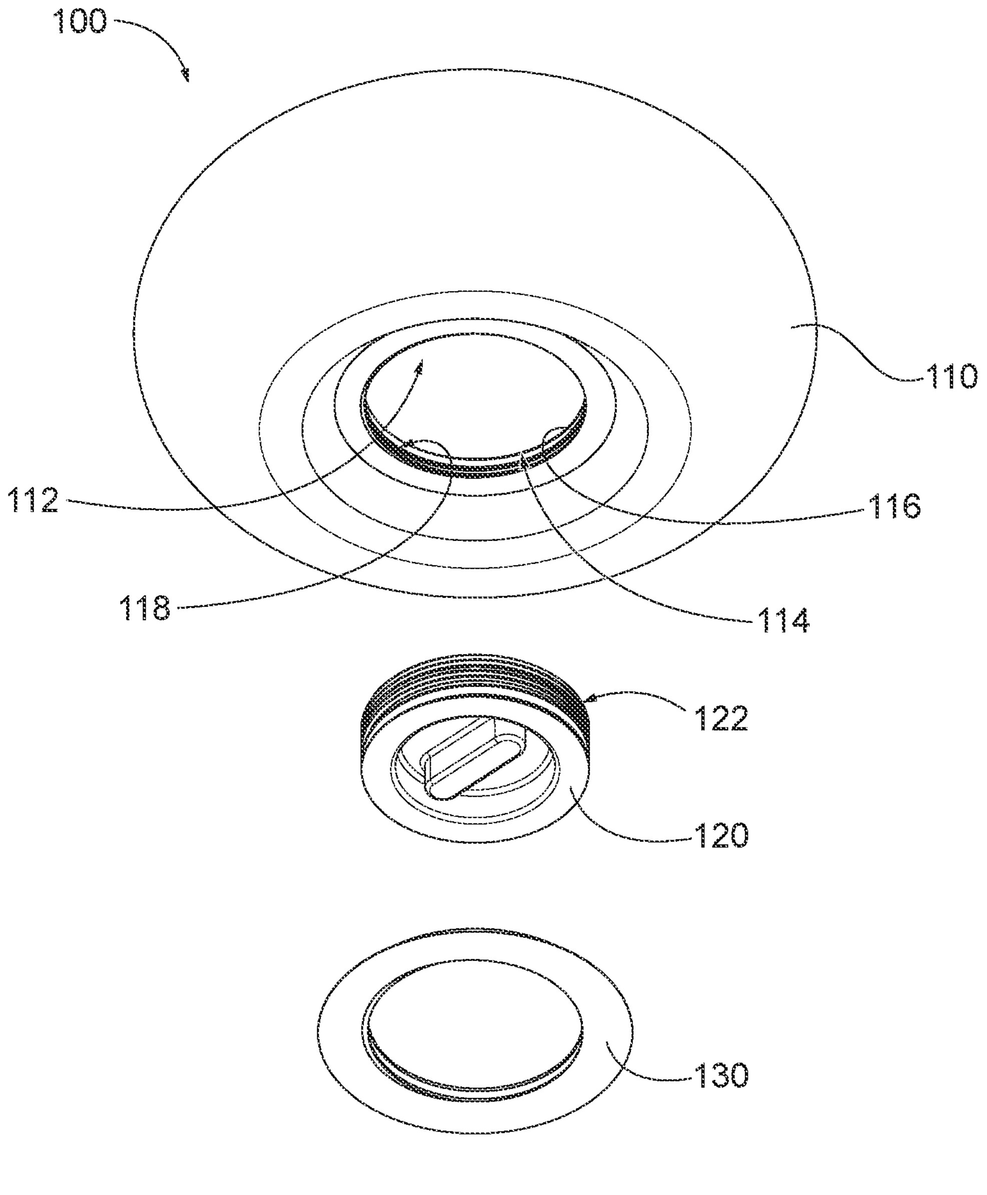
FIG. 2 is a bottom perspective view and exploded view of a tactile cremation container, in accordance with an example of the disclosure.

FIG. 1 illustrates a tactile cremation container 100. The tactile cremation container 100 comprises a bladder 110 of a material wrapping a hollow core, or void 112 (as illustrated by FIG. 2) therein. The tactile cremation container 100 may further comprise a cap 120, or seal, and an escutcheon 130, as further described below with respect to FIG. 2. The tactile cremation container 100 of FIG. 1 is an ellipsoid, or stretched sphere. The tactile cremation container may be of any selected shape. It may be a sphere, an ovoid, etc. It may even possess rigid edges such as that found in a cylinder, prism, or even a cube. Moreover, it may even be of a shape of a particular object or item. The selection of the shape of the tactile cremation container 100 may vary based on a grieving party's desire. In the example of the tactile cremation container 100 of FIGS. 1-2, the bladder material 110 substantially encloses the void 112. As used herein, substantially encloses means to enclose the void 112 with the exception of a cap 120, or seal, or with the exception of a cap 120, or seal, and/or valve, as further described below. The cap 120, or seal, may be further secured to, or received by the bladder material 110 to seal an opening 114, or aperture, extending through the bladder material 110. As illustrated by FIG. 2, the opening 114, or aperture, extends through the bladder material 110 into the void 112 of the tactile cremation container 100. It is within the void 112 the cremated remains are secured and maintained. It is through the bladder material 110 the cremated remains may be manipulated, in a tactile manner, in use.

Still referring to FIG. 2, the perimeter of the opening 114 through the bladder material 110 may comprise a fitting 116. The fitting 116 may simply be an extension of the bladder material 110 or formed in or of the bladder material 110. Alternatively, the fitting 116 may be separate from and simply attached to the bladder material 110. The bladder material 110 may be sealed to the fitting 116. The bladder material 110 may be sealed together by adhesive, molding, fusion, melting, or any other manner known in the art. The fitting 116 may comprise threads 118 for receiving the cap 120 that may comprise opposing threads 122. The fitting 116 may be a male fitting, having male threads, for receiving a female cap 120, having mating female threads (or vice versal). The cap 120 may be screwed into the fitting 116 to seal the opening 114 through the bladder material 110, thereby, fully enclosing the void 112 within the bladder material 110. This may be done to accomplish inurning the cremated remains within the tactile cremation container 100, thereby, sealing the cremated remains within the void of the tactile cremation container 100. The threads of the cap 120 and the fitting may be locking threads, or a locking mechanism, such that they may not be unlocked, or undone, once the cap 120 is threaded into the fitting 116. The cap 120 may be further sealed onto the fitting 116, or bladder material 110 by adhesive, molding, fusion, melting, or the like to form a permanent connection. Alternatively, the cap 120 and fitting 116 arrangements may comprise releasable locking threads, or other releasable locking mechanism, such that it may not be removed, or unsealed, unless a releasable lock is overcome. This otherwise semi-permanently seals the tactile cremation container 100 while also maintaining the ability to access the cremated remains at a later date in time in the event of transfer such as, for example, for spreading of the cremated remains. Such a releasable locking mechanism may be a mechanism such as a child safety locking mechanism, a removable pin arrangement, temporary adhesive, keyed connection or other releasable locking mechanism known in the art. It is appreciated herein that the cap and fittings are not limited to a threaded arrangement. The cap and fitting may be a clamped arrangement, a compression seal, a vacuum arrangement, a releasable spring arrangement, a pinned connection, a zipper arrangement, a combination thereof, or the like. Ultimately, the cap 120 is one that connects to the tactile cremation container 100 to seal and maintain the contents therein without the fear of inadvertently having the contents released when handling or using. This may be accomplished in a permanent manner. Alternatively, this may be accomplished in a releasable and/or resealable manner.

As further illustrated by FIGS. 1-2, an escutcheon 130 may be provided with the cap 120. The escutcheon 130 may be a part of the cap 120. By example, the escutcheon 130 may simply be a perimeter lip extending about the cap 120. In FIGS. 1-2, the escutcheon 130 is separate from the cap 120 but is secured to the tactile cremation container 100 by way of the cap 120. By example, the escutcheon 130 may be secured, or pinned, between a lip of the cap 120 and the bladder material 110 of the tactile cremation container 100 when sealed. The escutcheon 130 may snap fit into and/or between the fitting 116, the bladder material 110, and/or the cap 120. The escutcheon 130 may further seal the connection between the cap 120 and the fitting 116 or bladder material 110. The escutcheon 130 may further comprise a gasket material for making an additional seal with the bladder material 110 about the perimeter of the cap 120 and/or the fitting 116. The escutcheon 130 may additionally, or alternatively, provide a clean transition across the cap 120 and the bladder material 110 and/or may overlay or fully conceal the fitting 116 and/or the cap 120.

The fitting 116, the cap 120, and/or the escutcheon 130 may be of the same material or of a different material than the bladder material 110. While the fitting 116, the cap 120, and/or the escutcheon 130 may be of the same material as the bladder material 110 it may be of a different material density, thereby changing the rigidity of the material. In other words, it may be more rigid than the bladder material 110, thereby, not being as flexible, malleable, and/or manipulable as the bladder material 110. However, a degree of flexibility, malleability, and/or manipulability may be maintained by the fitting 116, the cap 120, and/or the escutcheon 130 to maintain a lesser degree of the soft compressible nature while still forming a seal, as opposed to being an overly stiff, brittle, sharp, and/or harsh material. The flexibility, malleability, and/or manipulability is based on still being able to provide the requisite seal, while also maintaining a degree of softness to the touch. As noted above, it is appreciated that one or more of the fitting 116, the cap 120, and/or escutcheon 130 may be of a different material then one another and/or of the bladder material 110 in order to achieve the objective noted herein. By example, the selected bladder material 110 may not come in varying densities, or the varying densities may not achieve the requisite material properties to form a seal as described herein. By example, a thin nylon material may be insufficient to create a cap 120 and/or fitting 116 arrangement. In the alternative, a polymer material may come in various densities such that a polymer relied on for the fitting 116 and/or cap 120 may be more rigid than the polymer material relied on for the bladder material 110. The same may be said for the escutcheon 130. The selected materials may be of similar or different materials, as described above, such that may be further compatible with one another such that they may additionally be adhered, fused, and/or friction fitted, to one another to perfect a seal. In some examples, the fitting 116, the cap 120, and/or the escutcheon 130 is recessed below the outer surface, or perimeter, of the bladder material 110, or recessed within the bladder 110. By recessing such components, a user would first contacts the bladder material 110 and the tactile nature of the cremated remains therein, without interacting with these components at the surface. Thereby, the fitting 116, the cap 120, and/or the escutcheon 130 are referred to as being low profile and/or even hidden, once an outer shell is added, as noted below. In another example, the fitting 116, the cap 120, and/or the escutcheon 130 is flush with the outer surface, or perimeter, of the bladder material 110, or flush with the bladder 110.

Figure 3:
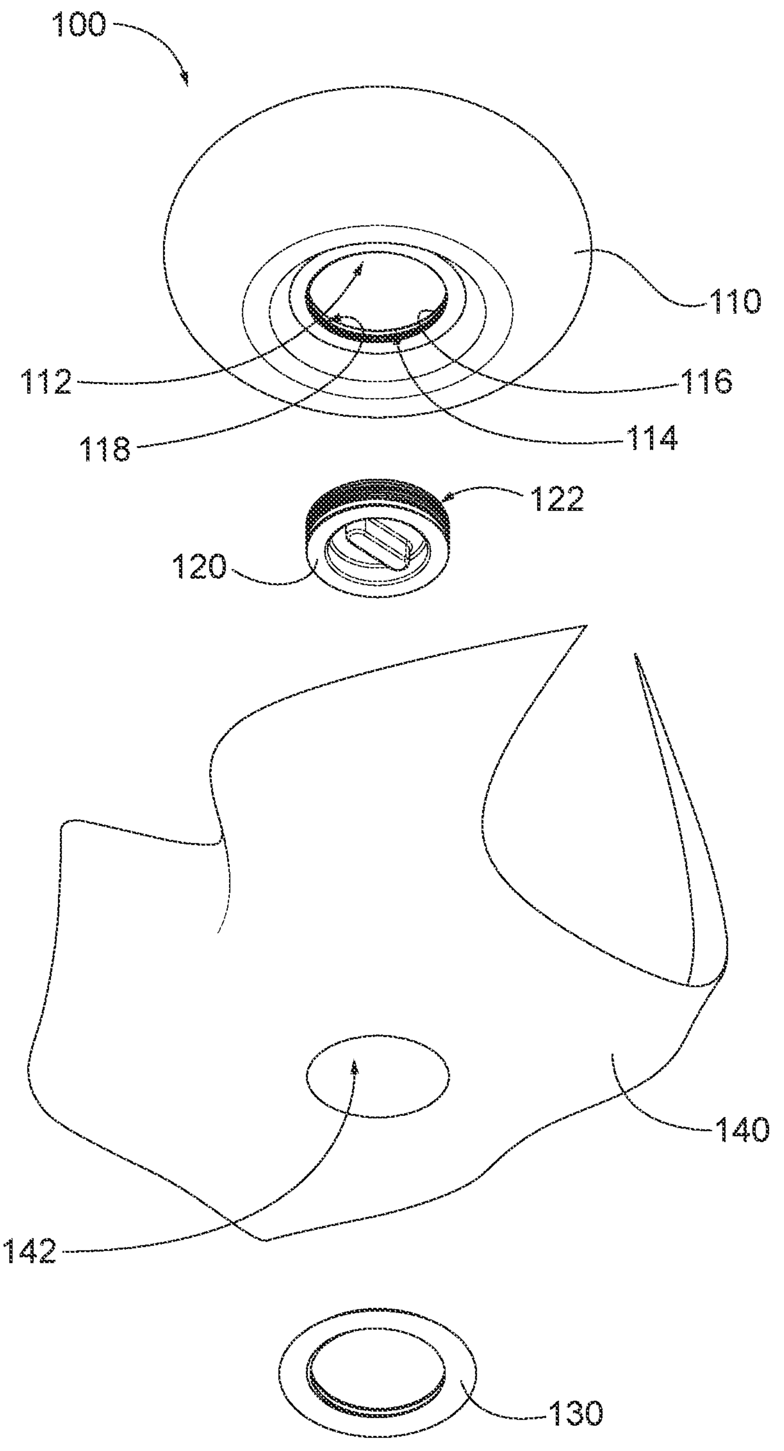
FIG. 3 is another bottom perspective view and exploded view of a tactile cremation container further with a shell, in accordance with an example of the disclosure.

Turning now to FIG. 3, a tactile cremation container 100, as described above with respect to FIGS. 1-2, is illustrated. FIG. 3 further illustrates an outer shell 140. The outer shell 140 may be a decorative shell for wrapping the tactile cremation container 100. By example, the outer shell 140 may be of a material which touches on a particular memory of a lost beloved. The outer shell 140 may even be of a fabric or material from clothing or a possession of a lost beloved. In examples, the outer shell 140 is intended to be decorative in nature. In particular, the outer shell provides a decorative element to the extent the selected material for the bladder material 110 may not be made in a visually appealing fashion or of desired colors. It provides an opportunity to personalize the nested arrangement of the tactile cremation container 100 without incurring material expense of personalizing the potentially more expensive bladder material 110. Moreover, the outer shell 140 may be interchangeable, washable, and/or replaceable as the tactile cremation container 100 is used through the numerous steps of the mourning process. By example, a first outer shell 140 may become soiled as it is cuddled with or as the grieving party expresses emotion (e.g., tears, saliva, mucus, etc.). The outer shell may be easily replaceable such that a grieving party may have multiple outer shells 140 for different objectives. By example, a grieving party may have one outer shell 140 for cuddling (e.g., a fabric once used by the lost beloved) that the grieving party may not wish to maintain as the outer shell 140 for fear of losing a lasting smell of the lost beloved on the material. Further, a grieving party may wish to have yet another outer shell 140 for displaying. Further yet, a grieving party may wish to have more outer shells 140 depending on the activity undertaken with the tactile cremation container 100 (e.g., outdoor activities). In addition to the decorative nature, the outer shell may also provide additional protective/durability benefits to the bladder, such as providing further puncture-resistant, water-resistant or fire-resistant capabilities or the characteristics described above with respect to the bladder material.

Figure 4:
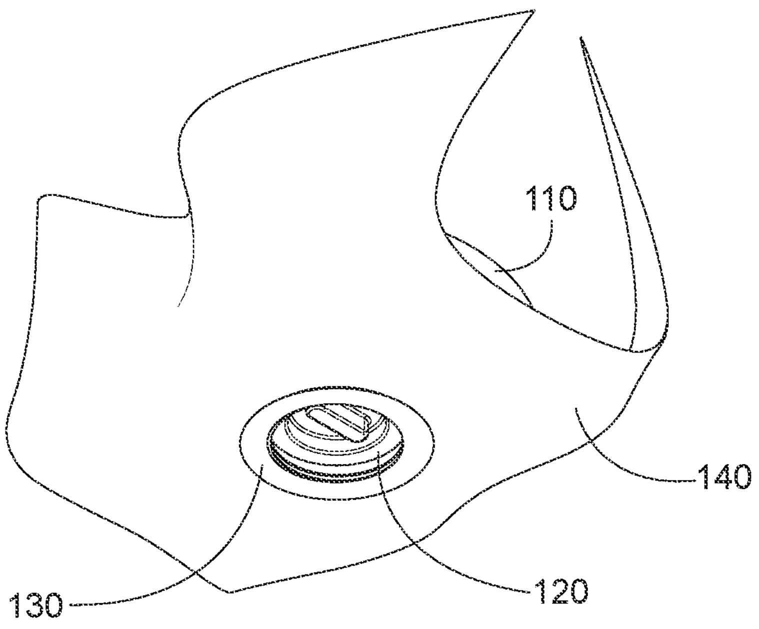
FIG. 4 is a bottom perspective view of a tactile cremation container within a shell, in accordance with an example of the disclosure.

Referring to both FIGS. 3 and 4, the outer shell 140 may be secured to the tactile cremation container 100 by way of the escutcheon 130. In one example, where the escutcheon 130 is secured to the bladder material 110 by way of the cap 120, the outer shell 140 is additionally secured by having an aperture 142 which overlays the opening 114 through the bladder material 110 and the aperture 132 in the escutcheon 130. The outer shell 140 may then be secured between a lip of the escutcheon 130 and the fitting 116 and/or the bladder material 110. In this arrangement, the outer shell 140 may not be removed except for when the cap 120 is removed. In some examples, the outer shell 140 may be threaded directly between the threaded arrangement of the fitting 116 and the cap 120. Alternatively, the escutcheon 130 may not be secured by placement or removal of the cap 120. Instead, the escutcheon 130 may be secured to the cap 120, the fitting 116, and/or the bladder material 110 in a removable manner, independent of removability of these other components. By example, the escutcheon 130 may be received into a recess within the cap 120, the fitting 116, and/or the bladder 110 by removably snapping it (e.g., snap ring) or removably securing it into engagement with one or more of these components. In such an arrangement, the escutcheon 130 may be removed without further removing the cap 120 that otherwise seals the tactile cremation container 100. Accordingly, the outer shell 140 may be interchangeable without too much obstacle to achieve the variety noted above, for replacement, for use, and/or for cleaning.

Figure 5:
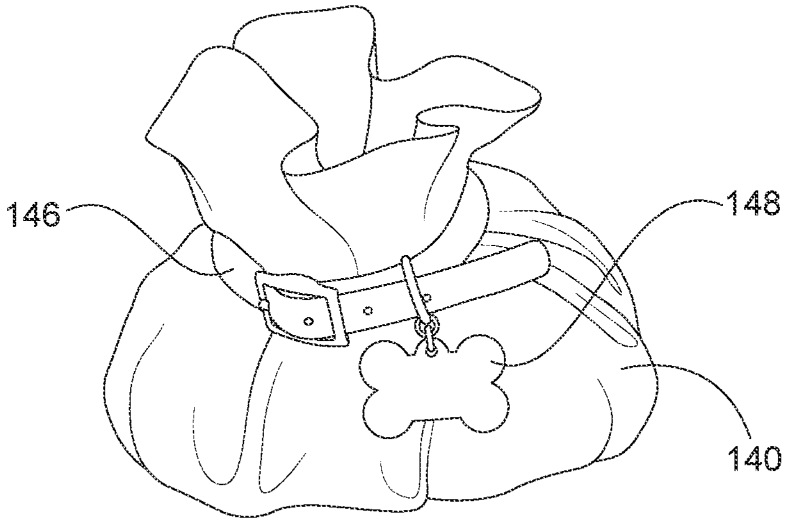
FIG. 5 is a top perspective view of a tactile cremation container within a shell, in accordance with an example of the disclosure.

In other examples, the outer shell 140 need not be secured to the cap 120, the fitting 116, and/or the escutcheon 130. Further, the outer shell 140 need not have an aperture 142 as noted above. Instead, the outer shell 140 may simply be a fabric cover that wraps the tactile cremation container 100 entirely. Regardless of whether the outer shell 140 is secured at an escutcheon 130, fitting 116, and/or cap 120, the outer shell 140 may be tied at its top once it is wrapped about the tactile cremation container 100. As illustrated by FIG. 5, the outer shell 140 may wrap a base of the tactile cremation container 100 and be enclosed at the top of the tactile cremation container 100. It may be tied with a string and/or identifier that may further comprise an identifier of the lost beloved. By example, the outer shell may be tied by a dog collar 146 with a dog tag 148, such as in the event the lost beloved is a deceased pet. While FIG. 5 illustrates a dog collar 146, other types of tags, such as identification tags may be utilized. For example, a luggage tag for traveling or transporting the tactile cremation container 100 through airports may be provided on the outer shell 140. Additionally, or alternatively, an identification tag may be provided directly on the bladder 110 such that it may be connected to the cap 120 or the escutcheon 130 without having to rely on the outer shell 140. By example, the cap 120 and/or escutcheon 130 may comprise an aperture for receiving a key-ring like identification tag. The identification tag may additionally be recessed within the cap 120, the fitting, and/or the escutcheon 130. In some examples, the outer shell 140 may be fitted such that it is held together by button(s), zipper(s), clip(s), or any other fastening device known in the art. It is further appreciated herein that in some examples the outer shell may additionally, or alternatively, be a fitted sleeve (e.g., neoprene, a neoprene-like material, Raylon, a combination thereof, or the like). The fitted sleave may be zipped, wrapped, fitted, or the like directly about the bladder without further being secured by any escutcheon or tie. In other words, the outer shell may be tightly engaging the bladder without excess fabric or material extending therefrom. It is further appreciated herein that, in some examples, a user may wish to permanently secure the outer shell 140 to the tactile cremation container 100. The various outer shell arrangements provide opportunity for creativity such that the grieving party may utilize memorable materials and/or fastening means which may induce memories of a lost beloved while also maintaining the intended function and adaptability of the present tactile cremation container.

The outer shell 140 need not have all the same characteristics as the bladder material 110 such as, for example, being a material which secures cremated remains without fear of releasing the cremated remains through the bladder material 110 or through an opening within the bladder material 110. In other words, the outer shell 140 need not be sealed as it may only be a decorative addition. While the outer shell 140 may be of the same material as the bladder material 110, it need not be. Instead, the outer shell 140 may be of a much thinner more decorative material. This may include fabric, a blanket, or even of a material having holes therein (e.g., doilies). Because it is of a thin decorative material it does not impede upon the tactile nature of the bladder material 110. In one example, the outer shell is a fabric that is 2 mm in thickness. In other examples, the outer shell may be a fabric that is 2 mm in thickness or less. A user continues to be able to engage the bladder material through the outer shell in the same manner noted above without impediment, such that they are capable of engaging the cremated remains therein in a tactile manner.

Figure 6:
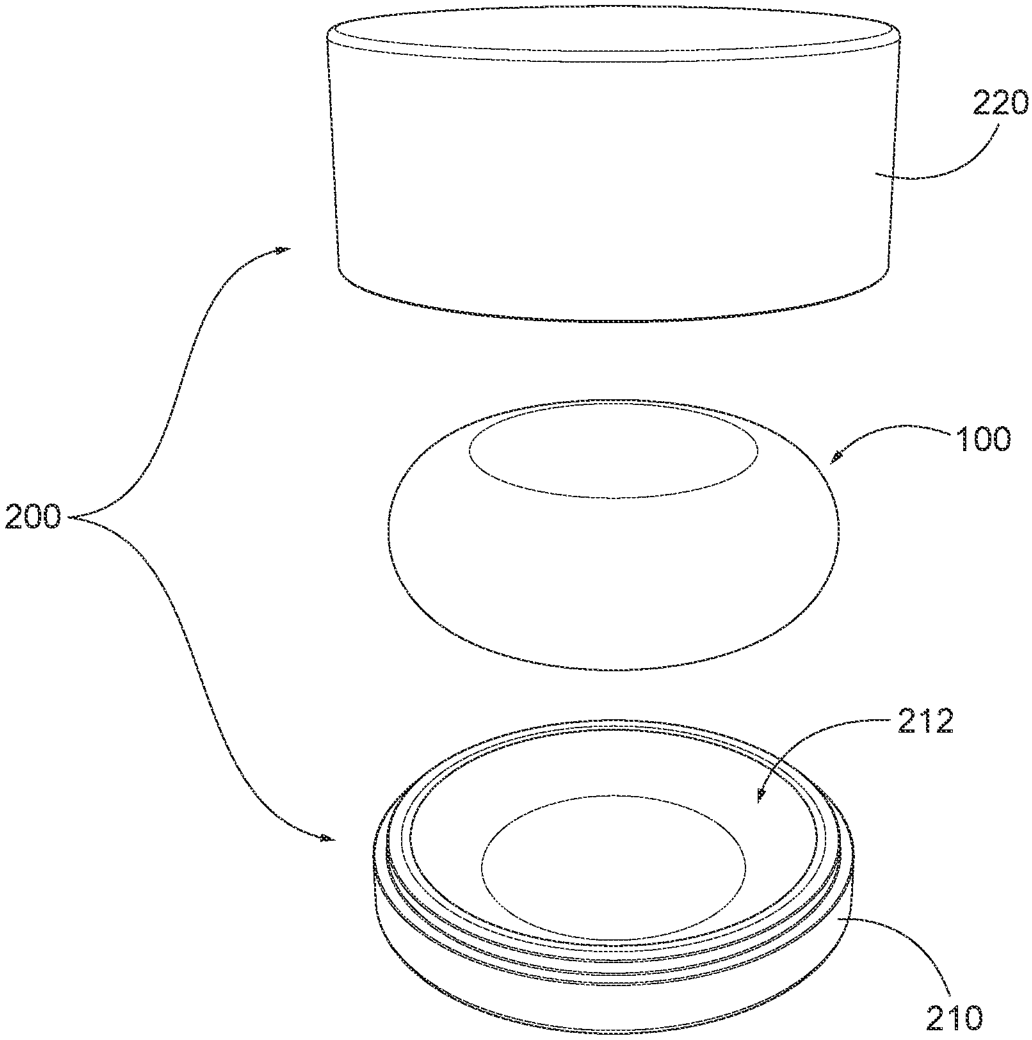
FIG. 6 is a top perspective view and exploded view of a tactile cremation container, in accordance with an example of the disclosure.
Figure 7:
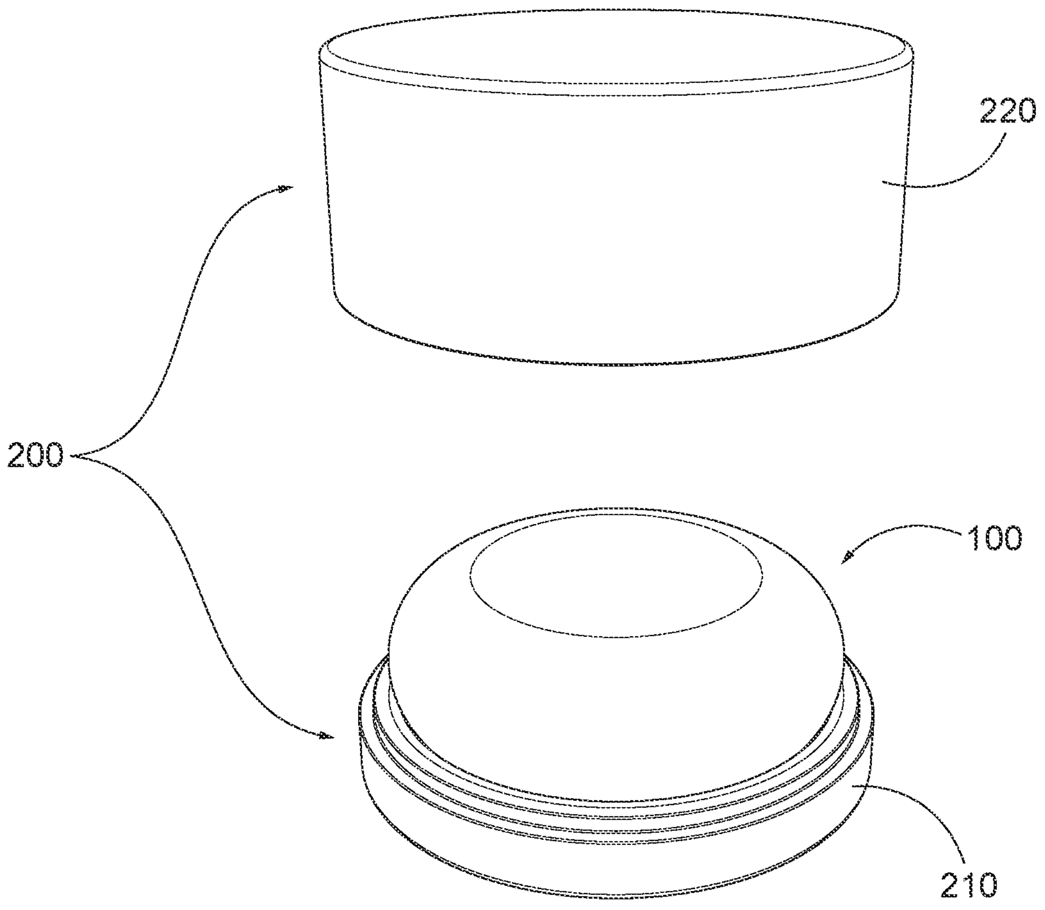
FIG. 7 is another top perspective view and exploded view of a tactile cremation container for nesting in an exterior case, in accordance with an example of the disclosure.
Figure 8:
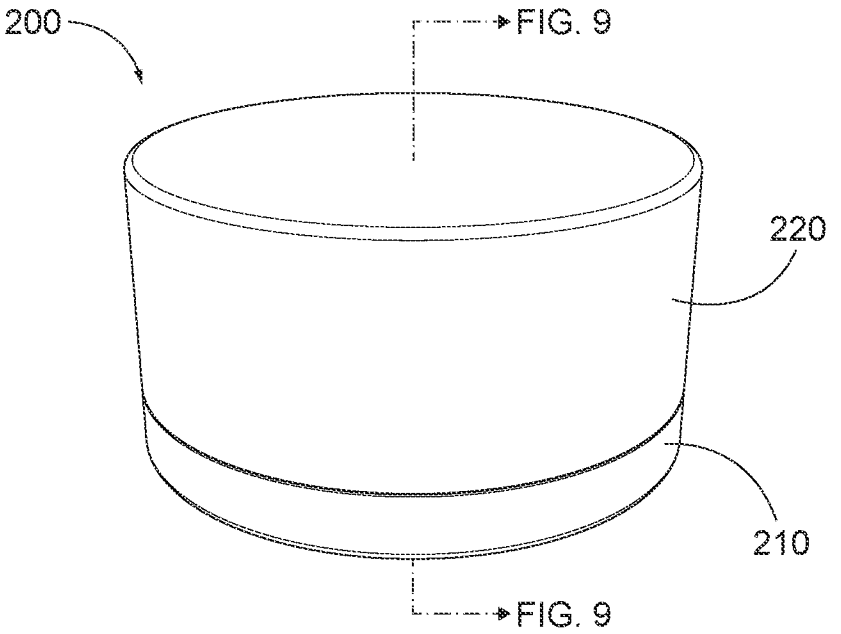
FIG. 8 is a top perspective view of a tactile cremation container nested in an exterior case, in accordance with an example of the disclosure.

Turning now to FIGS. 6-8, the tactile cremation container 100 may further be nested into a more rigid, or traditional, case, referred to herein as an exterior case 200. While the example of FIGS. 6-7 only illustrates a tactile cremation container 100 nested directly into the exterior case 200 it is appreciated herein that the tactile cremation container 100 may be nested first within an outer shell 140 (illustrated by FIGS. 3-5) and both the tactile cremation container 100 and the outer shell 140 (illustrated by FIGS. 3-5) may be nested within the exterior case. In FIG. 6, the exterior case 200 comprises a base 210 and a lid 220. The base 210 of the exterior case 200 may have a concave surface 212 for receiving and holding the tactile cremation container 100. The concave surface 212 is fitting for the arrangement of FIG. 6 as the tactile cremation container 100 of FIG. 6 is an ellipsoid. However, the base 210 of the exterior case 200 may be of any mating arrangement for receiving a tactile cremation container 100 of any shape (e.g., a flat recess for receiving the base of a cylinder). Upon placing the tactile cremation container 100 onto the base 210 of the exterior case 200 the lid 220 of the exterior case 200 may be placed overtop to fully conceal the tactile cremation container 100 therein. It is contemplated herein that the lid 220 need not be in use unless the particular mourning stage warrants it, or the grieving party desires. In other words, the tactile cremation container 100 may be maintained on the base 210, and the base 210 only, and left on display such as, for example, with the outer shell 140 (as illustrated by FIGS. 3-5) thereon. Yet, the grieving party may wish to fully conceal the tactile cremation container 100 at a particular mourning stage or for a particular purpose and the lid 220 may be placed overtop the tactile cremation container, where it mates at the perimeter of the base 210 to conceal the tactile cremation container 100 therein, such as that illustrated by FIG. 8. The exterior case 200 need not seal the tactile cremation container 100 therein, as the cremated remains are already sealed within the tactile cremation container 100. Therefore, the exterior case 200 provides yet another alternative for maintaining the cremated remains of a lost beloved based on a particular moment in time or a particular stage of grieving. Moreover, the exterior case 200 may be stackable, modular, and/or adjoining with additional exterior cases, or with additional space or multiple compartments therein, to allow a grieving party to house, stack, or arrange more than one beloved's remains (e.g., mother and father, dog and cat, or any arrangement of deceased beloveds).

Figure 9:
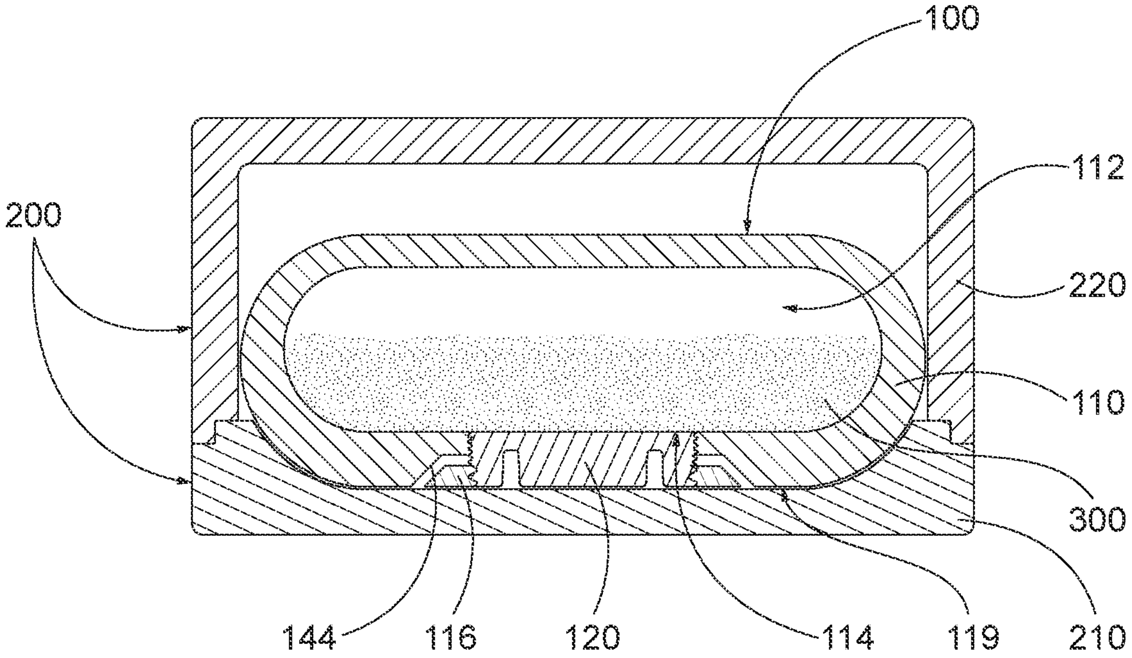
FIG. 9 is a cross-section of a tactile cremation container nested in an exterior case taken at line 9-9 of FIG. 8, in accordance with an example of the disclosure.

Turning now to FIG. 9, a cross-section of a tactile cremation container 100, nested within an exterior case 200, is provided. The cross-section illustrates the bladder material 110 with the void 112 therein. An opening 114 extends through a bottom 119 of the bladder material 110 where a cap 120 is secured to the bladder material 110 in a fitting 116. Further illustrated in FIG. 9 is a cavity 144 within the fitting 116, or directly within the bladder material 110, which allows for the insertion of the outer shell 140 (as illustrated by FIGS. 3-5) for securing the outer shell 140 (as illustrated by FIGS. 3-5) to the bladder material 110 once the cap 120 is secured. Cremated remains 300 are sealed within the void 112. The bottom 119 of the bladder material 110 rests on the base 210 of the exterior case 200. By resting the bottom 119 of the bladder material 110 on the base 210 of the exterior case 200 the opening 114, cap 120, and fitting 116 are each concealed without the addition of an outer shell 140 (as illustrated by FIGS. 3-5). Still yet, the outer shell 140 (as illustrated by FIGS. 3-5) may additionally conceal these components. In such an arrangement, the tactile cremation container 100 may be maintained on display on just the base 210 of the exterior case and/or for easy accessibility for utilizing the tactile cremation container 100. The lid 220 may be further fitted onto the base 210 of the exterior case 200 (e.g., such as in the dado joint illustrated in FIG. 8) to more fully, or completely, conceal the tactile cremation container 100 therein. The joint between the lid 220 and the base 210 of the exterior case 200 may further comprise a locking arrangement or a locking joint that may be secured (e.g., such as a dovetail joint that may lock when the lid and the base are twisted relative to one another, at latch, a keyed lock, a combination thereof, or the like) to prevent tampering with the contents.

It is appreciated that a user may be concerned with the durability of the tactile cremation container, the bladder material, and components thereof, as it is intended to be handled by the user. In particular, in order to seal the cremated remains within the tactile cremation container the tactile cremation container must be airtight when sealed. In addition to ensuring durability of the materials, in view of material selection as noted above, additional features are incorporated to reduce the risk of failure of the materials when being used in a tactile manner. The bladder material may come in many sizes. The size, shape, and arrangement of the bladder material may be selected based on the quantity of the cremated remains to be placed therein. By filling a majority (50% or more) of the void of the bladder material with the cremated remains the amount of air trapped in the void of the bladder material is reduced. In some examples, the void of the bladder material may be sized such that 75% of the void is filled with the cremated remains. In one example, the void of the bladder material may be sized such that 90% of the void is filled with the cremated remains. The void of the bladder material may be sized such that 50%-100%, 75%-100%, 90%-100%, 50%-90%, or 75%-90% of the void is filled with the cremated remains. Such arrangements may be provided based on a user's desired density of the cremated remains with the tactile cremation container. In one example, the tactile cremation container is measured 6 inches or less in any direction. It is appreciated herein, a funnel may be utilized for inserting the cremated remains through an opening in the bladder material into the void.

Additionally, or alternatively, a vent may be provided through the bladder material, the fitting, and/or the cap that allows a user to release air from the void. The vent, itself, may have a seal such as those seals identified above relative to the cap. The air may be released while the void is being sealed or upon having sealed the void. In the example of FIG. 9, the cavity 144 may also be the vent and release air when a cap 120 is partially secured to the fitting 116. A filter media may be provided at the vent to prevent release of the cremated remains while allowing air to be released from the void. Examples of such filter media include filter paper, filter cloths, wire mesh, a combination thereof, or the like. The vent may also allow a user to add air to the sealed void to change the tactile nature of the tactile cremation container. With more air in the tactile cremation container the tactile cremation container may feel more like a partially inflated balloon while still providing a tactile relationship directly with the cremated remains. With less air in the tactile cremation container, the tactile cremation container may feel more like a bag of sand. While one user may desire the partially inflated balloon feel another may be uncomfortable with a feeling the bladder material may pop under pressure (albeit the material is selected to prevent this) and may desire to feel just the weight of the ashes itself, movement of the materials within the bladder, and/or, generally, the presence of the material within the bladder. It is further appreciated, that while the presence of the material within the bladder is felt through the bladder the bladder may limit the tactile nature of the cremated remains such that the grieving party may not necessarily feel the individual granularity, lumps, bumps, and/or irregularity of the cremated remains, which may vary in size within the bladder material, but rather have a tactile relationship with the overall contents, such as through a silicon material bladder. In summary, such a vent, as described above, provides increased adjustability based on the degree of holding, cuddling, and/or manipulating that the tactile cremation container may undergo. Additionally, or alternatively, the vent may simply be a component of the fitting and/or cap such that a filter media may be secured over the opening onto which the cap is placed where air may be added or released as the cap is secured on the bladder material and/or fitting of the tactile cremation container. The filter media may be internal to the cap, fitting, and/or vent. The filter media may simply be positioned within the bladder material across these respective features.

Figure 10A:
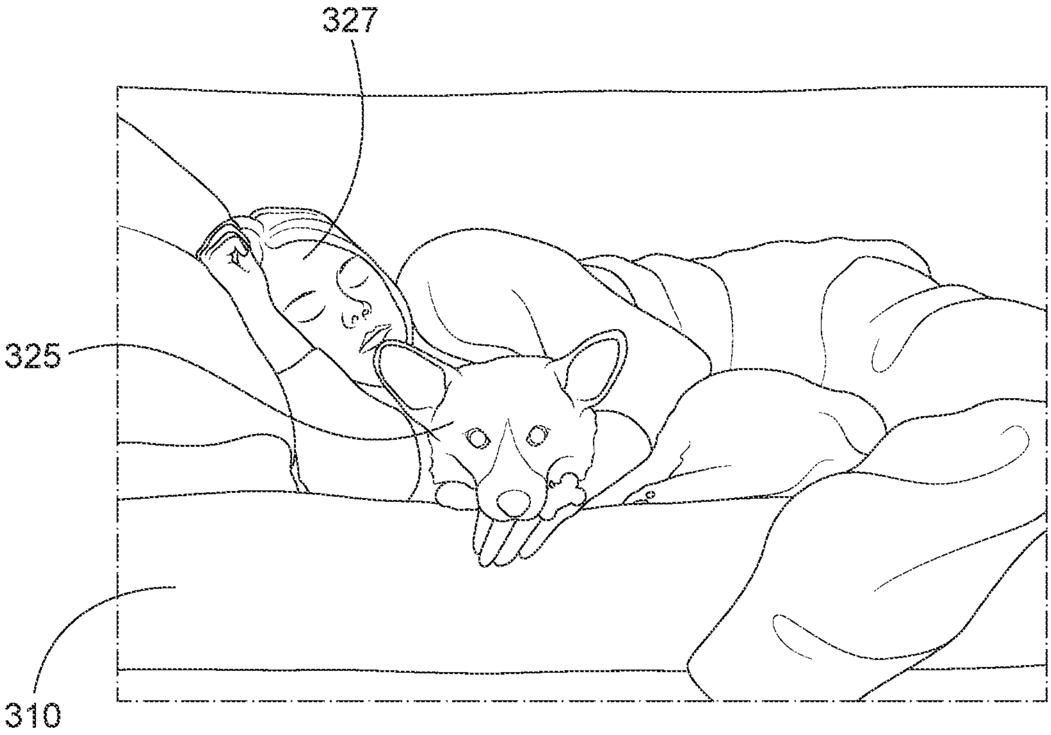
FIGS. 10A-10B are a storyboard illustrating the narrative of the beloved pet (FIG. 10A) and, thereafter, cherishing the beloved pet in a tactile cremation container (FIG. 10B), in accordance with an example of the disclosure.
Figure 10B:
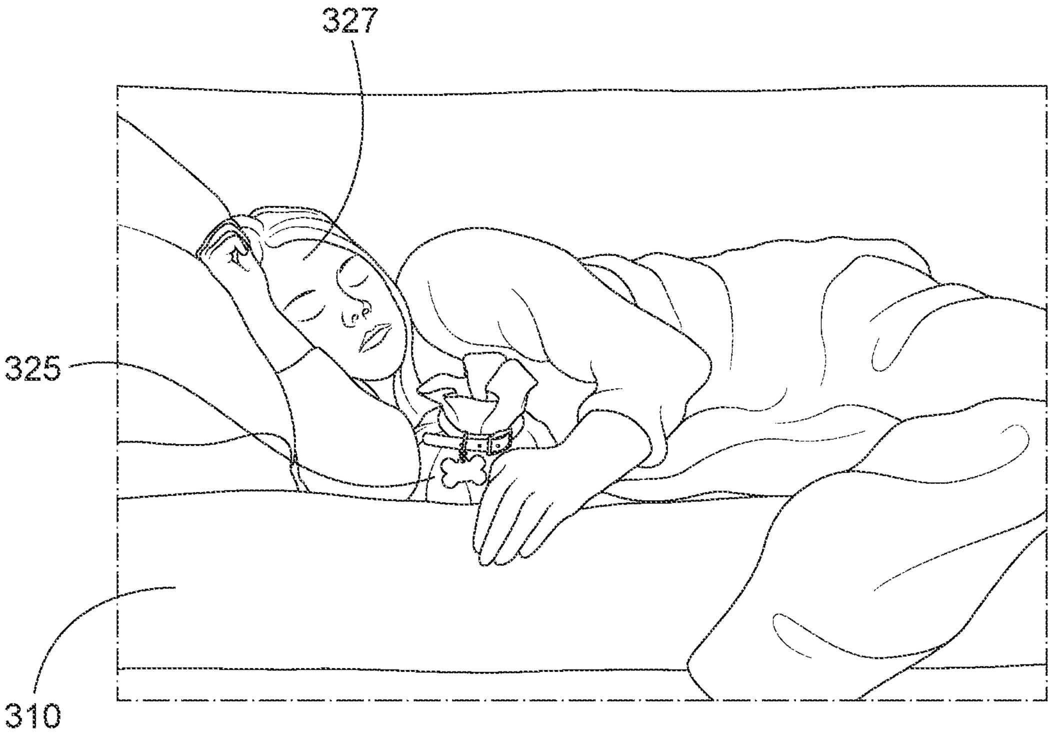

FIGS. 10A, 10B, 11A 11B, 12A, and 12B illustrate storyboards of various uses of the tactile and nested cremation container. In FIG. 10A, a beloved pet 325 is illustrated on a bed 310 in a bedroom with its owner 327. Comparatively, FIG. 10B illustrates the cremated remains of the same beloved pet on a bed 310 within a tactile cremation container 325 held by its owner 327. FIG. 10B simply illustrates the connection that may be maintained with a lost beloved pet by way of the tactile cremation container 320. Simply seeing the tactile cremation container 320 in a similar fashion at a similar place as the beloved pet would have been positioned brings comfort. More specifically, being able to engage the tactile cremation container 320 in a similar fashion as the pet would have been handled brings additional comfort. Further, due to the flexible nature of the tactile cremation container 320, a tactile cremation container 320 may be placed anywhere, even on an unstable surface such as a bed. Further, a user need not worry about tipping or spilling the tactile cremation container 320 when joining it on the bed 310 as it is sealed, stress-tested for human weight, stabilized, and may even be engaged and cuddled with as illustrated by FIG. 10B.

Figure 11A:
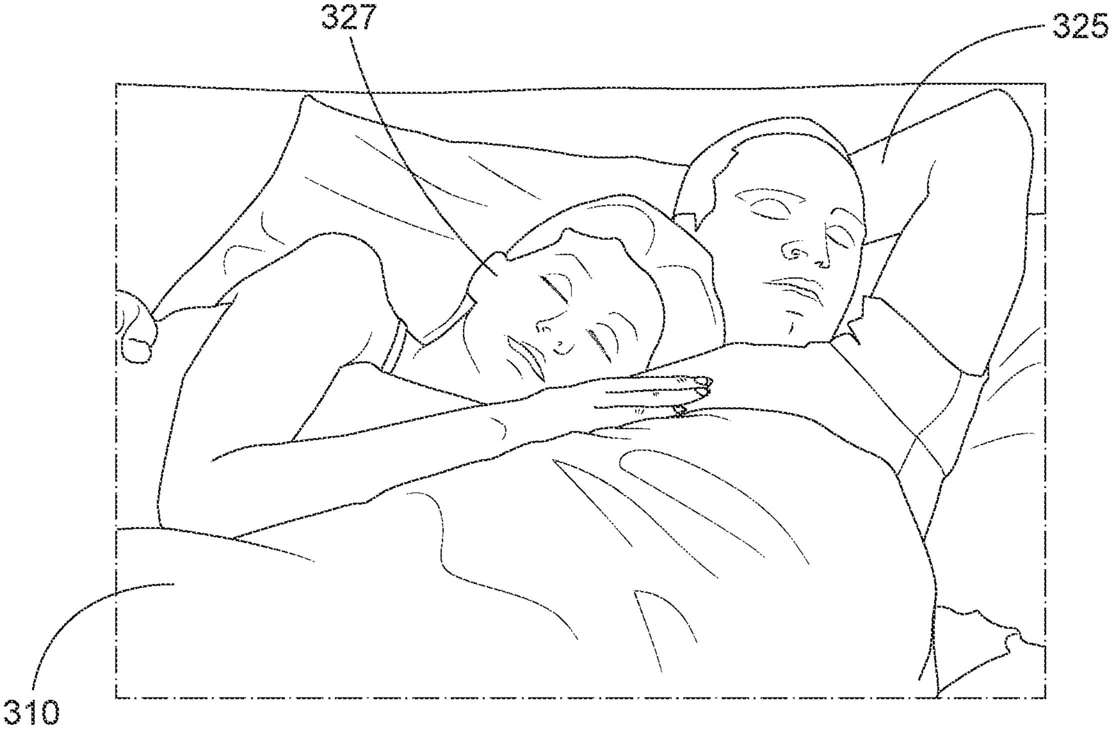
FIGS. 11A-11B are a storyboard illustrating the narrative of the beloved human (FIG. 11A) and, thereafter, cherishing the beloved human in a tactile cremation container (FIG. 11B), in accordance with an example of the disclosure
Figure 11B:
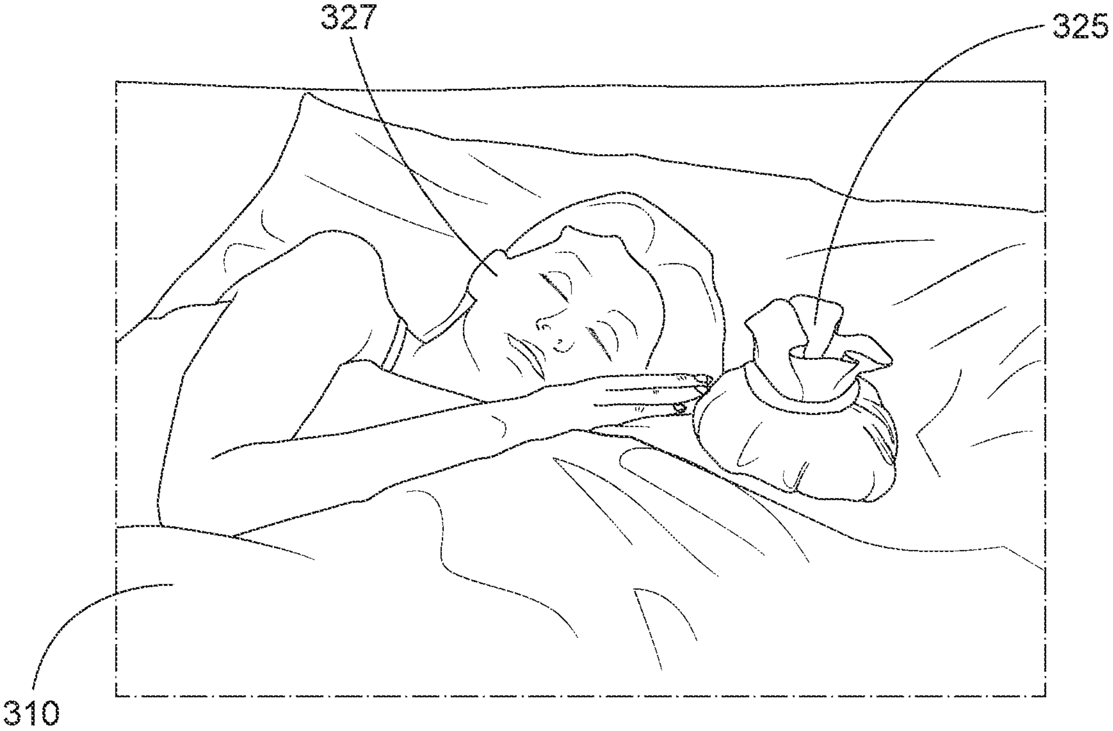

FIGS. 11A-11B illustrate the same features of FIGS. 10A-10B except, instead of a beloved pet 325 in FIGS. 10A-10B, the deceased is a beloved human 325 (FIG. 11A) in a tactile cremation container 325 (FIG. 11B) with their partner 327 in FIGS. 11A-11B, respectively. FIGS. 11A-11B are otherwise labeled and described the same as described with respect to FIGS. 10A-10B, above.

Figure 12A:
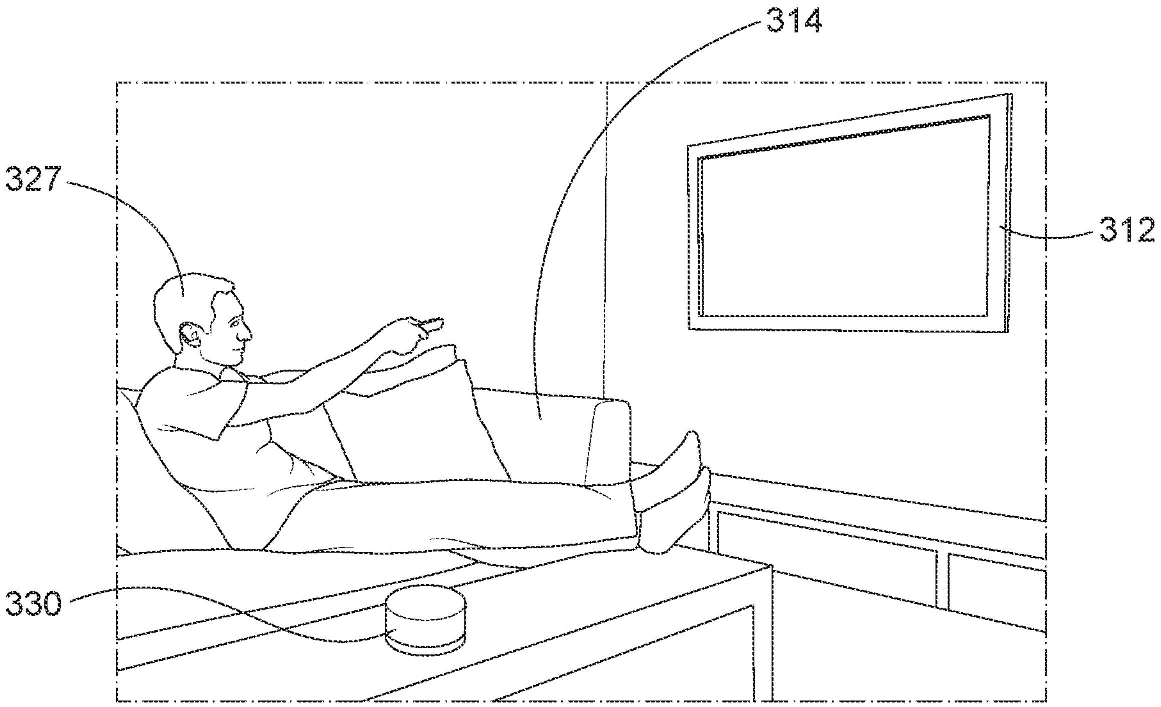
FIGS. 12A-12B are a storyboard illustrating the narrative of relying on physical comfort from the tactile cremation container with the shell present (FIG. 12B) and further utilizing a nested arrangement (FIG. 12A), in accordance with an example of the disclosure.
Figure 12B:
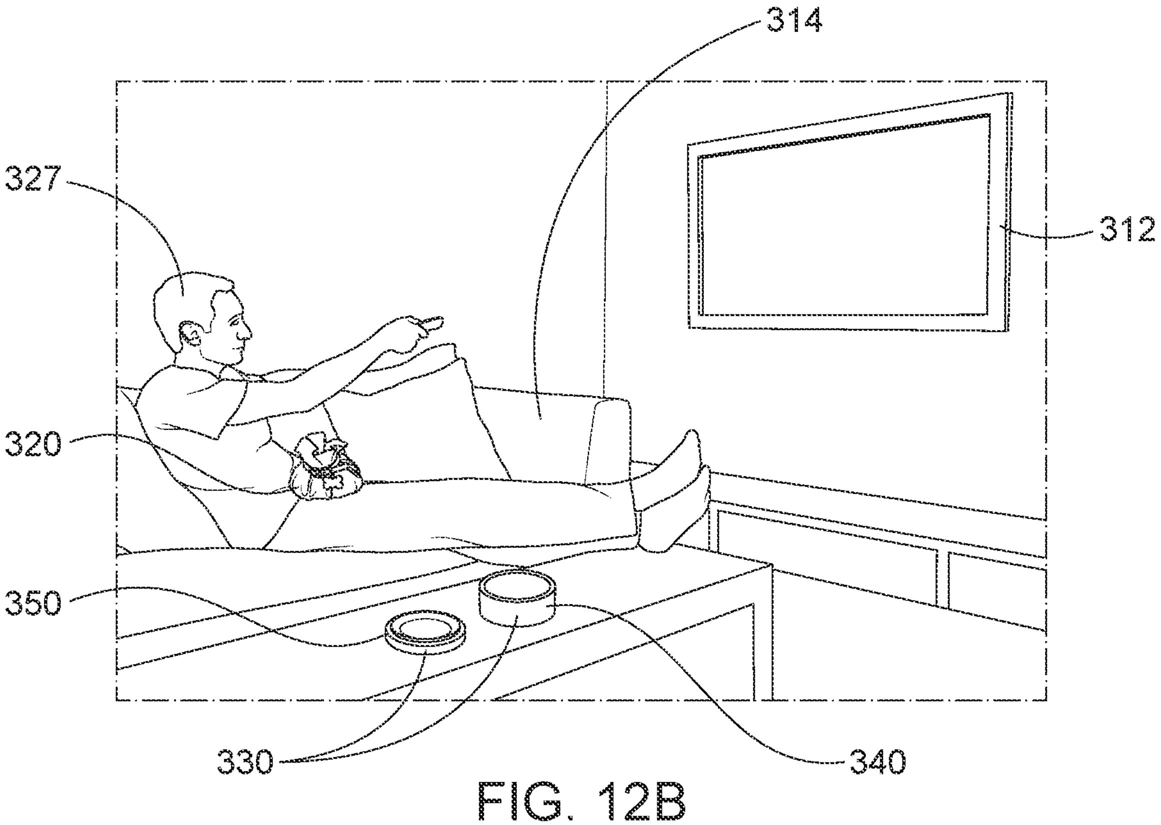

FIGS. 12A-12B further illustrate additional applicability provided by the nested arrangement. In FIG. 12A, a tactile cremation container is concealed within an exterior case 330 while a user 327 watches television 312 from a couch 314. Yet, the tactile cremation container is easily accessible in the event a user is craving a connection to a lost beloved. By example, in FIG. 12B, a user 327 may simply approach the exterior case 330 and remove the lid 340 from the exterior case to access, or expose, the tactile cremation container 320. Further yet, the user may remove the tactile cremation container 320 from the base 350 of the exterior case 330 and engage or hold the tactile cremation container 320. Still referring to FIG. 12B, a user 327 is able to relax and hold the tactile cremation container 320 while enjoying mundane activities, such as watching television 312 from a couch 314. This allows the user to feel connected with the lost beloved, by way of a tactile relationship to the cremated remains through the tactile cremation container 320. However, once the user 327 wishes to go about their day they may place the tactile cremation container 320 back into the exterior case 330, as represented by FIG. 12A. Although not illustrated, the beloved can still be a part of an annual hiking trip because the tactile cremation container is durable, compact and mobile allowing for it to be temporarily placed in a backpack. In other words, a user 327 is able to mourn during the same mundane, adventurous or sentimental activities they may have previously enjoyed with the lost beloved, or even carry out bucket list plans the user had hoped to do with the beloved—albeit in a different physical state. This is not only adaptable for the seven stages of mourning but also for years beyond.

While this invention has been described with reference to examples thereof, it shall be understood that such description is by way of illustration only and should not be construed as limiting the scope of the claimed examples. Accordingly, the scope and content of the examples are to be defined only by the terms of the following claims. Furthermore, it is understood that the features of any example discussed herein may be combined with one or more features of any one or more examples otherwise discussed or contemplated herein unless otherwise stated.

What is claimed is:

1. A tactile cremation container comprising:

a soft manipulable bladder comprising an internal void with cremated remains therein, an opening through the soft manipulable bladder into the void, and a recessed or flush seal sealing the opening through the soft manipulable bladder;

wherein the internal void is fully enclosed and the cremated remains are in direct contact with the soft manipulable bladder within the internal void; and wherein the void is airtight when sealed.

2. The container of claim 1 wherein the cremated remains are felt and manipulated within the soft manipulable bladder through the soft manipulable bladder.

3. The container of claim 1 wherein the seal is a threaded cap received by a threaded fitting extending from the soft manipulable bladder.

4. The container of claim 1 wherein the seal is a releasable lockable seal.

5. The container of claim 1 further comprising a filter media placed across the opening for removing air from within the void while maintaining the cremated remains within the void prior to sealing the seal.

6. The container of claim 1 further comprising a sealable vent extending through the seal or the soft manipulable bladder for adding or releasing air from within the void of the soft manipulable bladder.

7. The container of claim 1 that is an ellipsoid.

8. The container of claim 1 wherein the seal is of the same material as the soft manipulable bladder.

9. The container of claim 8 wherein the material of the seal has a density greater than a density of the material of the soft manipulable bladder.

10. The container of claim 1 wherein the soft manipulable bladder is a laminated material.

11. The container of claim 1 further comprising a removable outer shell wrapped about the soft manipulable bladder.

12. The container of claim 11 wherein the outer shell conceals the seal of the soft manipulable bladder.

13. The container of claim 11 wherein the outer shell is secured to the seal of the soft manipulable bladder by an escutcheon.

14. The container of claim 11 wherein the soft manipulable bladder remains manipulable through the outer shell.

15. A tactile and nested cremation container comprising:

a tactile cremation container comprising a soft manipulable bladder comprising an internal void with cremated remains therein, an opening through the soft manipulable bladder into the void, and a seal sealing the opening through the soft manipulable bladder, wherein the internal void is fully enclosed and the cremated remains are in direct contact with the soft manipulable bladder in the internal void, and wherein the void is airtight when sealed; and an exterior case comprising a base and a removable lid wherein the soft manipulable bladder removably rests on the base in a nested arrangement and is fully concealed by the removable lid when the lid is positioned on the base.

16. A method for arranging a tactile cremation container, the method comprising the steps of:

filling an internal void of a manipulable bladder of a tactile cremation container with cremated remains through an opening in the manipulable bladder wherein the cremated remains are in direct contact with the manipulable bladder;

bleeding air from the internal void of the manipulable bladder without releasing the cremated remains from the internal void of the manipulable bladder;

sealing the internal void of the manipulable bladder by applying a seal to the opening in the manipulable bladder such that the internal void is airtight; and tactilely manipulating the cremated remains directly through the manipulable bladder.

17. The method of claim 16 wherein in the step of filling the void of the manipulable bladder is done such that between 50% and 100% of the void of the manipulable bladder is filled with the cremated remains.

18. The method of claim 16 further comprising a step of: wrapping the tactile cremation container with an outer shell wherein the manipulable bladder of the tactile cremation container remains manipulable through the outer shell.

19. The method of claim 16 further comprising a step of: nesting the tactile cremation container within an exterior case by placing the tactile cremation container on a base of the exterior case and adding a removable lid to the base of the exterior case to fully enclose the tactile cremation container.

20. A tactile cremation container comprising:

a soft manipulable bladder comprising an internal void with cremated remains therein, an opening through the soft manipulable bladder into the void, and a recessed or flush seal sealing the opening through the soft manipulable bladder;

a filter media placed across the opening for removing air from within the void while maintaining the cremated remains within the void prior to sealing the seal;

wherein the internal void is fully enclosed and the cremated remains are in direct contact with the soft manipulable bladder within the internal void.

21. A tactile cremation container comprising:

a soft manipulable bladder comprising an internal void with cremated remains therein, an opening through the soft manipulable bladder into the void, and a recessed or flush seal sealing the opening through the soft manipulable bladder;

a sealable vent extending through the seal or the soft manipulable bladder for adding or releasing air from within the void of the soft manipulable bladder;

wherein the internal void is fully enclosed and the cremated remains are in direct contact with the soft manipulable bladder within the internal void.

22. A tactile cremation container comprising:

a soft manipulable bladder comprising an internal void with cremated remains therein, an opening through the soft manipulable bladder into the void, and a recessed or flush seal sealing the opening through the soft manipulable bladder;

wherein the internal void is fully enclosed and the cremated remains are in direct contact with the soft manipulable bladder within the internal void; and wherein the seal is of the same material as the soft manipulable bladder.

23. The container of claim 22 wherein the material of the seal has a density greater than a density of the material of the soft manipulable bladder.

24. A tactile cremation container comprising:

a soft manipulable bladder comprising an internal void with cremated remains therein, an opening through the soft manipulable bladder into the void, and a recessed or flush seal sealing the opening through the soft manipulable bladder;

a removable outer shell wrapped about the soft manipulable bladder;

wherein the internal void is fully enclosed and the cremated remains are in direct contact with the soft manipulable bladder within the internal void; and wherein the outer shell is secured to the seal of the soft manipulable bladder by an escutcheon.

25. A tactile and nested cremation container comprising:

a tactile cremation container comprising a soft manipulable bladder comprising an internal void with cremated remains therein, an opening through the soft manipulable bladder into the void, and a seal sealing the opening through the soft manipulable bladder wherein the internal void is fully enclosed and the cremated remains are in direct contact with the soft manipulable bladder in the internal void;

a filter media placed across the opening for removing air from within the void while maintaining the cremation remains within the void prior to sealing the seal; and an exterior case comprising a base and a removable lid wherein the soft manipulable bladder removably rests on the base in a nested arrangement and is fully concealed by the removable lid when the lid is positioned on the base.

26. A tactile and nested cremation container comprising:

a tactile cremation container comprising a soft manipulable bladder comprising an internal void with cremated remains therein, an opening through the soft manipulable bladder into the void, and a seal sealing the opening through the soft manipulable bladder wherein the internal void is fully enclosed and the cremated remains are in direct contact with the soft manipulable bladder in the internal void;

a sealable vent extending through the seal or the soft manipulable bladder for adding or releasing air from within the void of the soft manipulable bladder;

an exterior case comprising a base and a removable lid wherein the soft manipulable bladder removably rests on the base in a nested arrangement and is fully concealed by the removable lid when the lid is positioned on the base.

27. A tactile and nested cremation container comprising:

a tactile cremation container comprising a soft manipulable bladder comprising an internal void with cremated remains therein, an opening through the soft manipulable bladder into the void, and a seal sealing the opening through the soft manipulable bladder, wherein the internal void is fully enclosed and the cremated remains are in direct contact with the soft manipulable bladder in the internal void, and wherein the seal is of the same material as the soft manipulable bladder;

an exterior case comprising a base and a removable lid wherein the soft manipulable bladder removably rests on the base in a nested arrangement and is fully concealed by the removable lid when the lid is positioned on the base.

28. The container of claim 27 wherein the material of the seal has a density greater than a density of the material of the soft manipulable bladder.

29. A tactile and nested cremation container comprising:

a tactile cremation container comprising a soft manipulable bladder comprising an internal void with cremated remains therein, an opening through the soft manipulable bladder into the void, and a seal sealing the opening through the soft manipulable bladder wherein the internal void is fully enclosed and the cremated remains are in direct contact with the soft manipulable bladder in the internal void;

a removable outer shell wrapped about the soft manipulable bladder wherein the outer shell is secured to the seal of the soft manipulable bladder by an escutcheon;

an exterior case comprising a base and a removable lid wherein the soft manipulable bladder removably rests on the base in a nested arrangement and is fully concealed by the removable lid when the lid is positioned on the base.

* * * * *